UNITED STATES PATENT OFFICE.

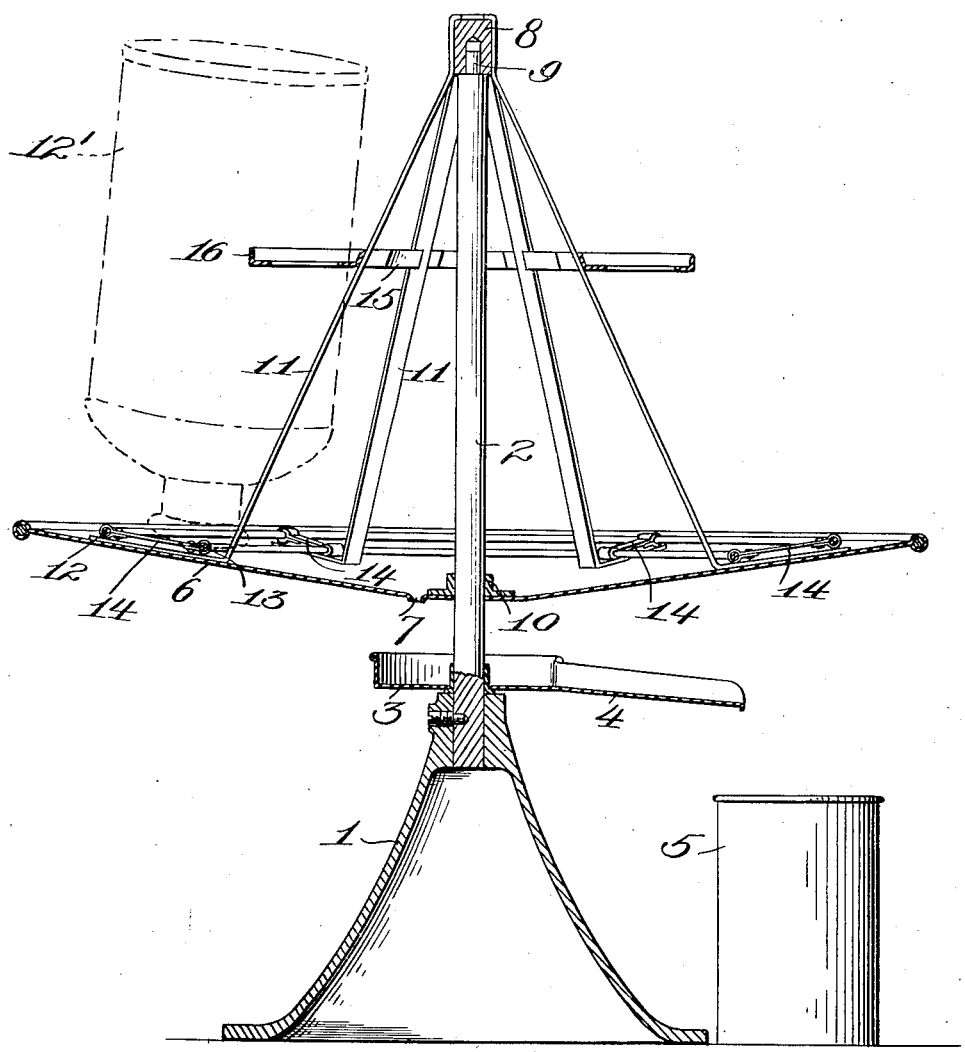

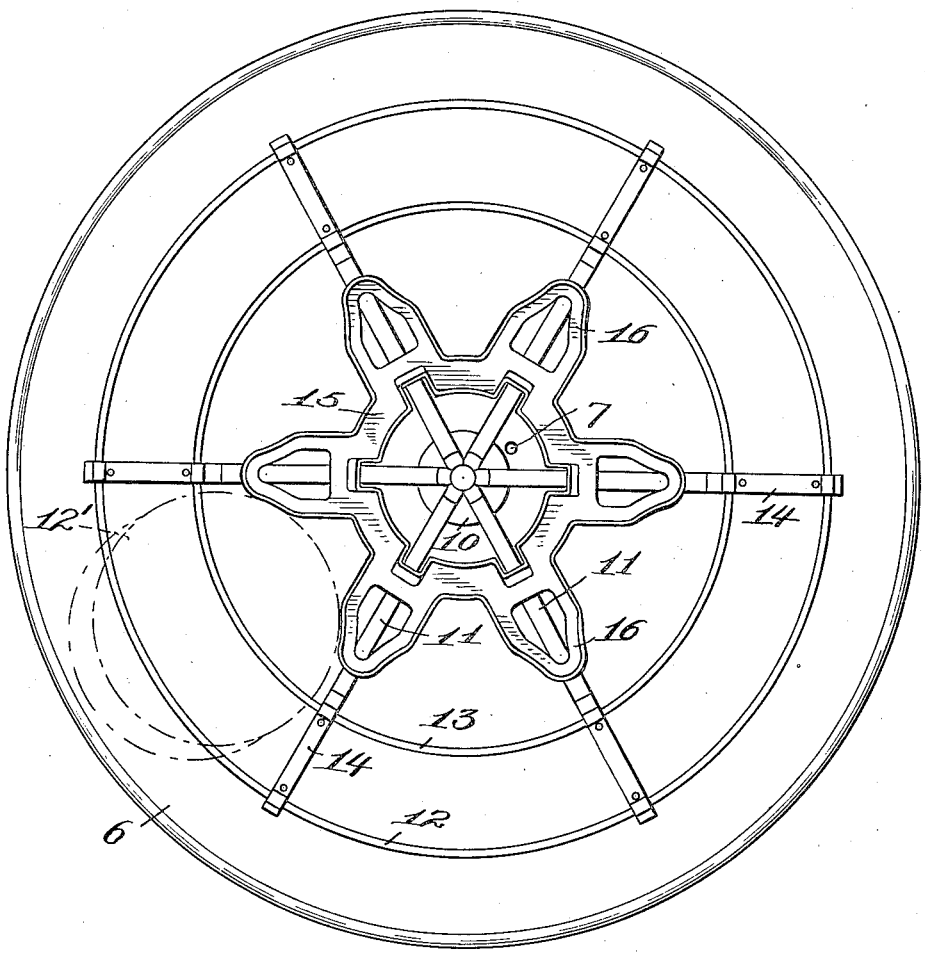

JOSEPH WILLMANN, OF SHELTON, CONNECTICUT.

APPARATUS FOR RECOVERING LIQUIDS FROM RECEPTACLES.

932,931. Specification of Letters Patent. Patented Aug. 31, 1909.

Application filed October 10, 1908. Serial No. 457,125.

*To all whom it may concern:*

Be it known that I, JOSEPH WILLMANN, a subject of the Emperor of Germany, residing at Shelton, in the county of Fairfield and State of Connecticut, have invented new and useful Improvements in Apparatus for Recovering Liquids from Receptacles, of which the following is a specification.

My present invention has for its object to provide a simple, inexpensive and efficient device for draining and recovering liquids, such for instance, as milk and cream from cans or other receptacles whereby the milk or liquid so drained may be recovered and saved, and the cans or receptacles shall be completely emptied, thus preventing a loss of the liquid and facilitating the cleansing of the cans and receptacles, the device involving a revoluble carrier upon which the cans or receptacles may be successively placed in inverted position and in an annular row so that each can or receptacle occupies a position upon the carrier for a period of time sufficient to thoroughly drain it, each can immediately after being emptied of its contents being mounted upon the carrier after removal of the appropriate can in the row, the revoluble mounting for the carrier permitting handling of the cans with the greatest facility and rapidity.

To these and other ends, the invention consists in certain improvements, and combinations and arrangements of parts, all as will be hereinafter more fully described, the novel features being pointed out particularly in the claims at the end of the specification.

In the accompanying drawing: Figure 1 represents a side elevation partly in section of a draining and drip saving apparatus constructed in accordance with my invention; and Fig. 2 represents a plan view of the same.

Similar parts are designated by the same reference characters in the several views.

In emptying liquids from a considerable number of receptacles, an appreciable quantity of the liquid adheres to the walls of such receptacles and is usually lost. For instance, in handling milk of average consistency, the quantity of milk left in the cans after emptying in the usual manner is sufficient to fill one can for each four-hundred cans emptied. The present invention provides an apparatus which serves to thoroughly drain the cans or receptacles and to recover the liquid remaining in them which liquid would otherwise be lost, the apparatus being simple in its construction and capable of being manipulated with the greatest facility.

In the accompanying drawing, I have shown one embodiment of the invention wherein it comprises a base 1 which is preferably flared at the bottom so as to afford sufficient stability to the apparatus, and a vertical shaft or spindle 2 is mounted upon the base, its lower end being preferably seated in a recess formed in the top of the base. Surrounding the shaft or spindle is a pan 3 which is preferably annular in form and rests directly upon the top of the base, a spout 4 being provided which leads from the pan and serves to conduct liquid therefrom into a can or other receptacle 5 in which the liquid drained from the cans or receptacles is recovered. A revoluble carrier is preferably employed for supporting the cans or receptacles, this carrier comprising in the present instance a tray 6 preferably circular or annular in form and having its surface sloped downwardly so as to form a collecting chamber or depression toward its center. A tray of conical form may be conveniently constructed from sheet material, a drain opening 7 being formed in the tray at substantially its lowermost level, this opening being directly above the pan 3 so that the liquid collected in the tray may flow through this opening into the pan irrespective of the angular position of the carrier relatively to the base. The tray is supported by a bearing cap 8 which rests upon the top of the spindle and is provided with a recess to receive a reduced stem 9 of the spindle, a bushing 10 being fitted in the center of the tray, and having a revoluble engagement with the shaft or spindle, the bearing cap serving as a thrust bearing to sustain the weight of the carrier, while the bushing 10 serves to steady the tray and prevent leakage of the liquid around the shaft. The tray is reinforced in order to sustain the weight of the cans or receptacles by means of a set of brace rods 11, the upper ends of which are suitably attached to the bearing cap and they extend radially and are inclined downwardly and outwardly from the axis of the tray and toward its periphery, they being riveted or otherwise suitably attached to the upper surface of the tray. These brace rods are of such a number as will permit them to accommodate cans or receptacles of the desired sizes between them. The cans or receptacles 12' are supported preferably in an annular row and in inverted position upon the upper side of the tray and, in order to mount the cans in upright position and thereby insure a thorough draining thereof, a rack is provided having a surface upon which the rim or neck of the can or receptacle rests. This can-supporting rack in the present instance is composed of a pair of rings 12 and 13 which are preferably concentric with the axis of the carrier and are connected together and secured to the upper side of the tray by means of a suitable number of cross straps 14 the ends of which are preferably doubled and secured about the respective rings as shown. The inner ring in the present instance is at a lower level than the outer ring, and therefore, the cans resting thereon will be tilted inwardly at their upper ends, so that there is no tendency of the cans to fall from the carrier. In order to properly space the cans from one another and to support them at the proper inclination, a rest 15 is provided, that shown in the present instance being annular so as to surround and rest upon the upper portions of the inclined brace rods, a set of arms 16 extending outwardly from the rest above each brace rod so as to provide a set of spacers which enter the spaces between the secured cans and thus keep them properly spaced. In the present instance, these spacing arms are concaved on those sides which engage the cans so that the latter will substantially fit the spacers and thus avoid any possibility of the spacers denting the cans. These spacers also enable the carrier to be turned through the agency of the cans resting thereon.

In using a draining and drip-saving apparatus constructed in accordance with the present embodiment of the invention, the cans or receptacles after being emptied are placed successively and in an annular row upon the rack of the carrier, the latter being rotated one step preparatory to the placing of each can or receptacle, and after the carrier has been completely filled, the can first placed upon the carrier is removed and one just emptied is substituted therefor, the operation being repeated until each can has been thoroughly drained of the contents which remain therein after the usual mode of emptying the cans. The liquid drained from the inverted cans flows through the central or depressed portion of the tray and this collected liquid flows through the outlet into the pan 3, and from the latter it discharges through the spout 4 into a suitable receptacle wherein the drippings are recovered.

I claim as my invention:—

1. A device of the class described comprising a suitable base, a carrier rotatably mounted thereon adapted to support a plurality of receptacles in inverted position and having a tray rotatable therewith for collecting liquid drained from the receptacles, said tray being provided with a discharge opening, and means for receiving liquid from said discharge opening.

2. A device of the class described comprising a revoluble carrier having means for supporting an annular row of receptacles in inverted position thereon, a tray revoluble with the carrier and having a depressed portion and an outlet through which the drained liquid may pass, and a stationary annular pan for receiving the liquid discharged through said opening.

3. A device of the class described comprising a suitable base and a revoluble carrier rotatably mounted thereon, said carrier embodying a tray having a depressed portion and an outlet opening therefor through which the liquid collected in the tray may be discharged and having brace rods extending downwardly and outwardly, their outer ends being attached to the tray and the rods being spaced to accommodate receptacles between them.

4. A device of the class described comprising a suitable base having a shaft or spindle supported vertically thereon, a carrier revoluble on said shaft and comprising a tray adapted to support receptacles in inverted position thereon and having a discharge opening toward its center, and an annular pan mounted on the top of said base and beneath the tray to receive liquid from the discharge opening therein.

5. A drip saver comprising a base having a vertical spindle thereon, a revoluble carrier supported by the spindle and embodying a tray to support a plurality of cans or receptacles in inverted position, the tray being depressed toward its center and provided with a discharge opening, and a pan mounted on the base and below the tray to receive liquid drained through the discharge opening thereof.

6. A drip saver comprising a suitable base and a carrier revoluble on a vertical axis relatively thereto, said carrier comprising a tray depressed toward its center and provided with a discharge opening, and a series of brace rods attached to the upper end of said vertical axis and adapted to receive an annular row of receptacles in inverted position between them.

7. A device of the class described comprising a suitable base, a carrier revoluble thereon and having a drip receiving tray adapted to revolve therewith and to receive and support a plurality of cans or receptacles, and a rest adapted to coöperate with the upper portions of said cans or receptacles to retain them in proper position.

8. A device of the class described comprising a drip receiving tray adapted to receive an annular row of cans or receptacles above it, and an annular rest to be arranged within the row of cans or receptacles to space and support them in inclined position.

9. A device of the class described comprising a drip receiving tray, means for supporting an annular row of cans or receptacles above it and in inclined position, and an annular rest having spacing devices adapted to coöperate with the cans to retain them in proper position.

10. A device of the class described comprising a drip receiving tray rotatable on a vertical axis, and a rack for supporting cans or receptacles thereon in positions inclined centrally toward said vertical axis.

11. A device of the class described comprising a drip receiving tray having its upper surface inclined downwardly toward its center, and a rack arranged on the upper surface of the tray and embodying inner and outer rings for supporting an annular row of cans or receptacles in inclined position.

12. A device of the class described comprising an annular drip receiving tray, a series of suitably spaced brace rods engaging its upper side and forming spaces between them to receive an annular row of cans or receptacles, and an annular rest arranged above the tray and having spacing arms to enter between and coöperate with the cans or receptacles to retain them in proper position.

In testimony whereof I have hereunto set my hand in presence of two subscribing witnesses.

JOSEPH WILLMANN.

Witnesses:
  JAMES L. NORRIS,
  CHAS. S. HEYER.